Figure 5:
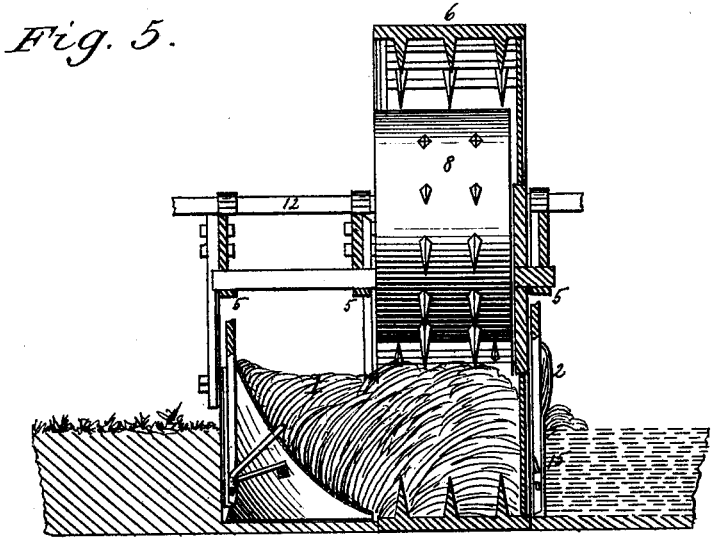

C. E. SACKETT.
Combined Plow, Harrow, and Drill.
No. 220,176. Patented Sept. 30, 1879.
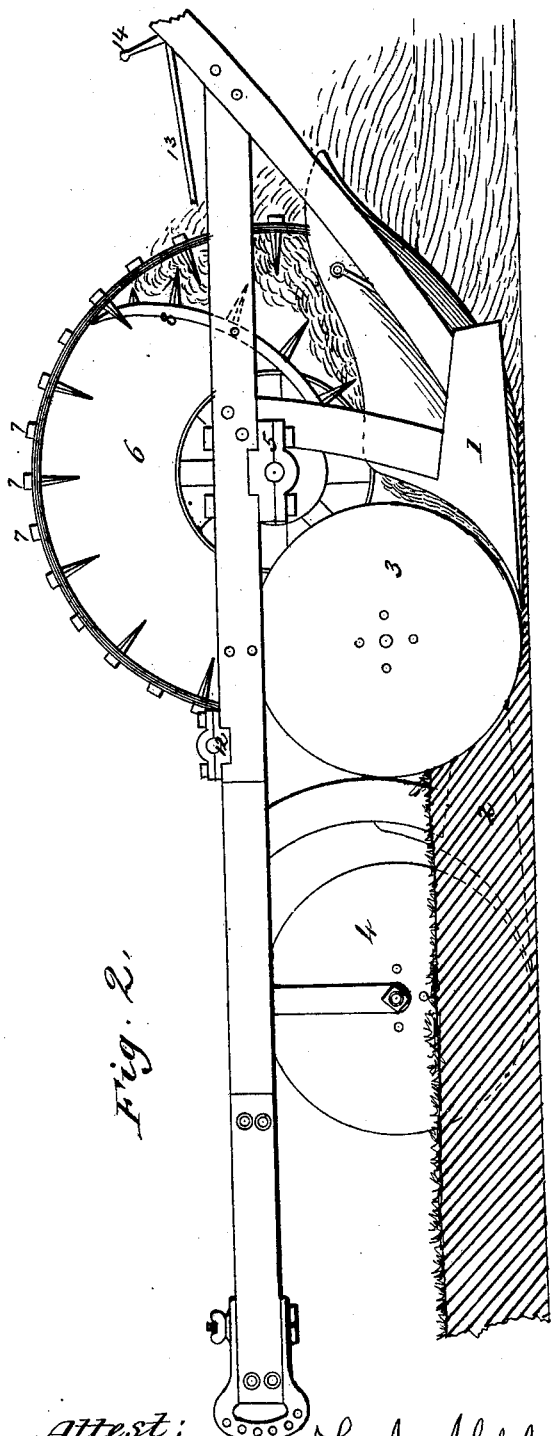
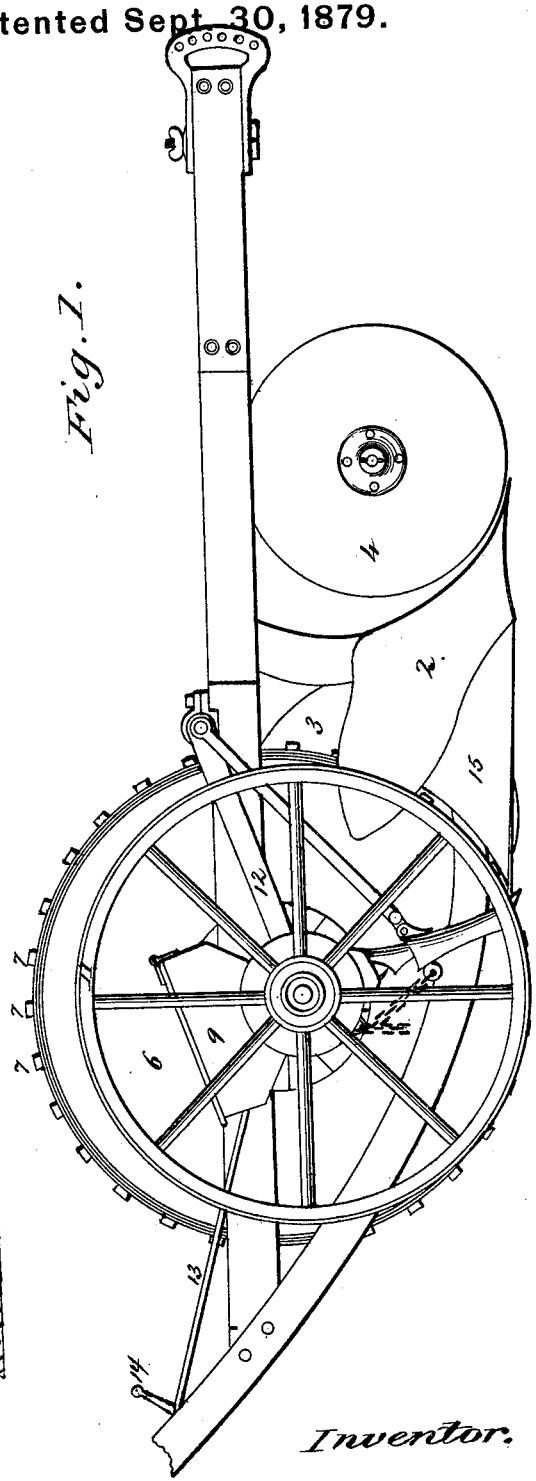
Attest:
S. A. Appleby
Frank W. Harrison
Inventor:
Chas. E. Sackett

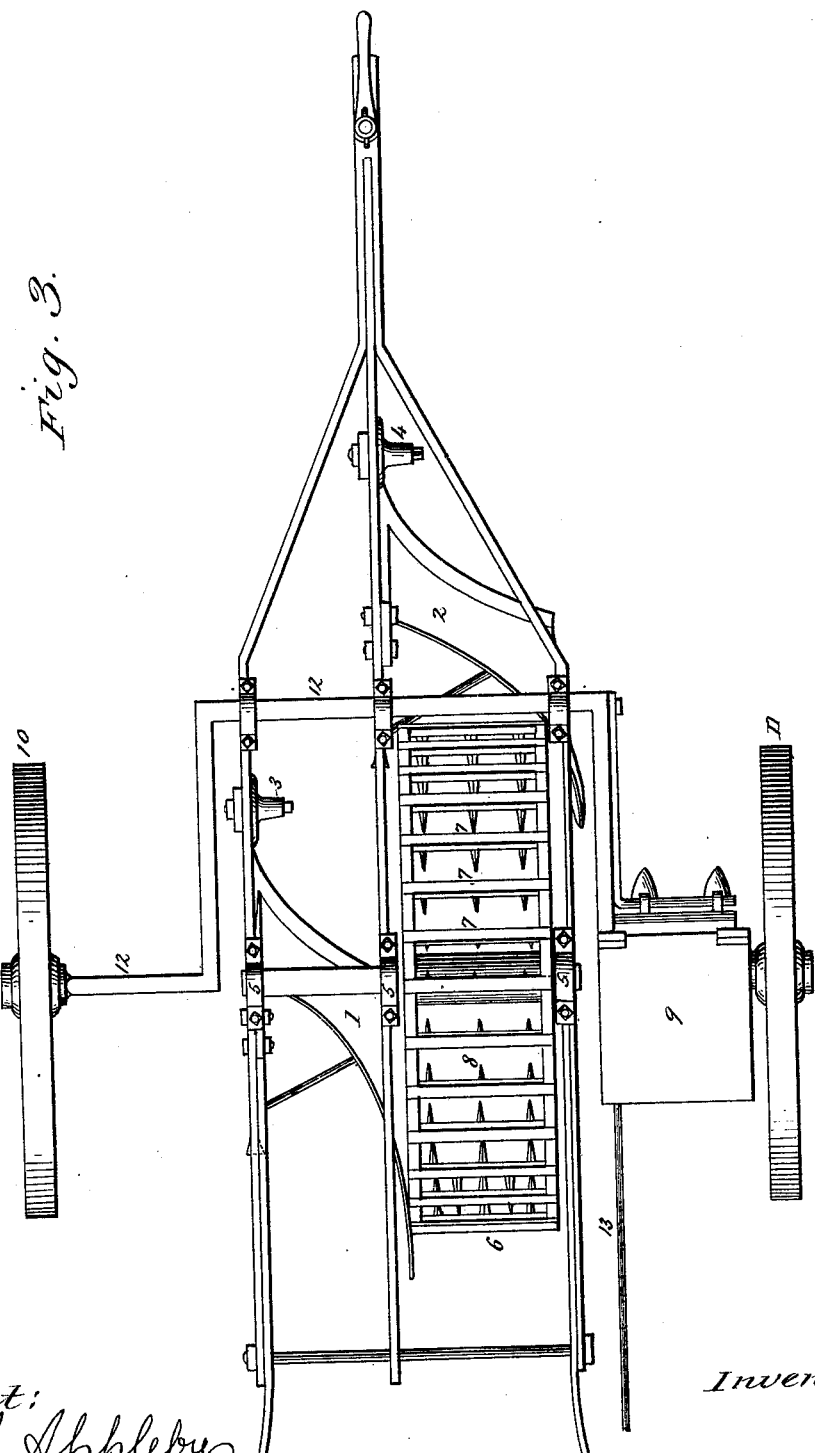

C. E. SACKETT.
Combined Plow, Harrow, and Drill.
No. 220,176. Patented Sept. 30, 1879.

Attest:
J. H. Appleby
Frank H. Hansen

Inventor
Chas E Sackett

UNITED STATES PATENT OFFICE.

CHARLES E. SACKETT, OF MATILDA FURNACE, WAYNE TOWNSHIP, MIFFLIN COUNTY, PENNSYLVANIA.

IMPROVEMENT IN COMBINED PLOW, HARROW, AND DRILL.

Specification forming part of Letters Patent No. 220,176, dated September 30, 1879; application filed May 14, 1879.

*To all whom it may concern:*

Be it known that I, CHARLES E. SACKETT, of Matilda Furnace, Wayne township, Mifflin county, and State of Pennsylvania, have invented certain new and useful Improvements in Combined Plow, Harrow, and Drill; and I do hereby declare that the following specification, in connection with the accompanying drawings, is a full, clear, and exact description of my invention, and such as will enable others skilled in the art to which it pertains to make and use the same, reference being had to the accompanying drawings, which form part of this specification.

My invention consists in the combination, with one or more plows suitably arranged, of a revolving toothed harrow, whereby all the earth plowed up is thoroughly pulverized and mixed with air, and, being in a state fit for immediate planting, of the combination therewith of a seed-drill of convenient device for automatic planting at the same time and in the one continuous operation.

Various devices for carrying my improvement into practice may be employed.

This form of tilling-implement admits of the operator riding and controlling his implement as well as by walking.

I have shown in the drawings the broad features claimed in their simplest combination, and purpose obtaining separate patents hereafter for more convenient and special devices for handling.

In the accompanying drawings similar figures of reference indicate like parts.

Figure 4:
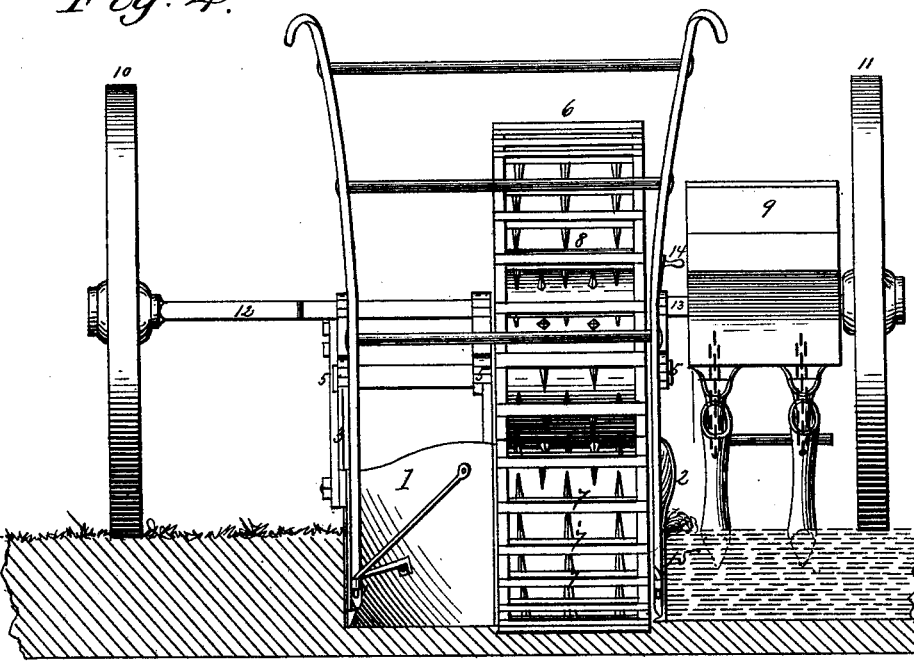

Figure 1 is a side elevation of the furrow side of the implement above ground. Fig. 2 is a side elevation on the land side of the implement in the land, the land and implement being in vertical section on a line with the land side of the land-plow. Fig. 3 is a plan view. Fig. 4 is a rear view. Fig. 5 is a vertical cross-section through the revolving harrow, the pulverizing-plate being in projection.

To a convenient frame are suitably secured by the usual methods the land-plow 1 and the furrow-plow 2. These may be preceded by the ordinary knife or revolving sod-cutters 3 and 4, which also serve a useful purpose to cut corn-stalks, &c., into shorter lengths. Behind the furrow-plow, and as close to it as it will revolve and clear the mold-board, is secured to the frame in suitable bearings, 5 5 5, a revolving harrow, 6. This harrow forms a hollow barrel, slightly narrower than the furrow-plow, so as to follow it in the furrow with easy clearance. It is partially or entirely closed upon the furrow side, and partially or entirely open upon the land side. Its outer circumference is composed of slats 7 7 7, forming suitable spaces for the passage of the earth through them, and they may be adapted to any width or shape of opening. These slats, being continued through the rim of the barrel, are provided with teeth at convenient distances for rotating the earth thrown into the barrel by the land-plow. The earth, being torn apart and lifted by these teeth in connection with the rotary movement of the barrel, will, if it be loose and friable, at once work its way through the openings into the open furrow behind; but if wet, or inclined to turn from the plow in solid clods or lengths of sod, as is often the case, the most of it will be carried upward as the barrel rises, until it is met by the intersecting teeth attached to the fixed shield or pulverizing-plate 8. Between these two sets of teeth, the earth, be it sods, clods, or roots, will now be ground and forced through the passages to the outside of the harrow, where it will drop into the furrow in any desired degree of pulverization, according to the description of teeth and the size of the passages used.

The teeth may be of any desirable form, and the slats between the periphery spaces set at any inclination to the upward movement, or be of any shape, such as a knife-edge, to most readily facilitate the passage and disintegration of the earth as it is forced against them by the pressure of the pulverizing-plate. This plate also admits of being set at any eccentric curve of closure with the barrel, so as to force the earth out faster if desired. It also may be retained in its position by a heavy spring, so as to pass by and release obstacles which cannot be crushed, such as stones.

The land-plow 1 is secured to the frame on the land or open side of the harrow in such position that all the earth turned over by it will fall within the barrel of the harrow, which is made as large as practicable for this purpose. The bottom line of the mold-board of the land-plow follows the periphery of the harrow, so as to finally close all the earth into it, and it may then be continued rearward a short distance to guide the dropping earth into the furrow.

Both plows have a slight elevation above the bottom of the revolving harrow, so that it bears the weight of the entire implement, and its diameter being large, it insures an easy draft for this reason, as well as by its continually removing the earth from the land-plow by rolling it away, instead of the usual forced sliding over the extended mold-board, necessary to push the earth away. The preparation of the earth for planting being thus accomplished, a seed-drill, 9, of a desirable device for automatic planting, is attached to the implement in a convenient manner. In the drawings it is shown as supported by the bearing-wheels 10 11, by which it also is actuated, hung upon the bent axle 12, so that the implement, in turning furrow-corners, will revolve upon the base of the harrow-barrel as a common center. The bearing-wheels are spread sufficiently to allow the seed-drill to occupy a space a sufficient distance from the furrow-plow on the prepared-earth side as to insure no disturbance of the earth in which the seed is planted, either by the next passage of the implement or by the trampling of the horses. The bearing-wheels, being thus spread, serve to steady the revolving harrow, allowing it to be of considerable height, which affords ample interior space and ease of operation. A rod, 13, extending rearward from the seed-drill to a handle at 14, enables the operator to cut off the dropping of the seed at any time. Thus, in planting corn, seed would be dropped in plowing every third furrow only, and only one planting-hoe would be allowed to work. In planting wheat seed would be dropped in plowing every furrow, and both planting-hoes would be used. The two planting-hoes admit of being placed at adjustable distances apart. By this method of combining the seed-drilling with the plowing, marking out for corn is avoided, and a saving of seed and land will ensue from the infallible regularity of the process, no land being either duplicated or omitted.

The operation of the implement is as follows: On ordinarily smooth roads or fields the implement, by depressing the handles, can be rolled upon the revolving harrow and bearing-wheels to the point of beginning. The beam being dropped and the team started, the furrow-plow will enter the earth first and clear the way for the revolving harrow, which, as it settles into the furrow, carries the land-plow with it. On the first round both plows act as land-plows; but after the first furrow is opened the furrow-plow has but little to do but to keep the opened furrow clear of what earth may have fallen back into it. Having reached the end of the furrow, by depressing the handles, and thus elevating the plow-points, the revolving harrow will roll the implement to the surface, where it can be faced in any direction, and further proceed as in ordinary plowing.

What I claim as my invention is—

1. In a tilling apparatus, the combination with a plow carried on a frame, of a wheel supporting said frame and adapted to move on the bottom of the furrow last made, and to receive and pulverize the earth from the furrows in process of making, as set forth.

2. In a tilling apparatus, a revolving pulverizer, closed or partially closed on the furrow side, adapted to receive the earth from the land side, and provided with internal pulverizing apparatus adapted to pulverize the earth and to let it drop in the furrow behind the pulverizing-wheel, as set forth.

3. In combination with the revolving pulverizer having bars and teeth, as set forth, the shield 8, fixed to the shaft and operating in connection with the plow and the revolving wheel, as and for the purpose set forth.

4. In combination with a tilling apparatus consisting of a plow and a revolving pulverizer receiving the earth from the plow, moving in the furrow last made, and leaving the pulverized earth therein, a seeding device, the parts operating together as set forth.

In testimony whereof I have signed my name to this specification in the presence of two subscribing witnesses.

CHAS. E. SACKETT.

Witnesses:
T. A. APPLEBY,
FRANK H. HARRISON.